Figure 1:
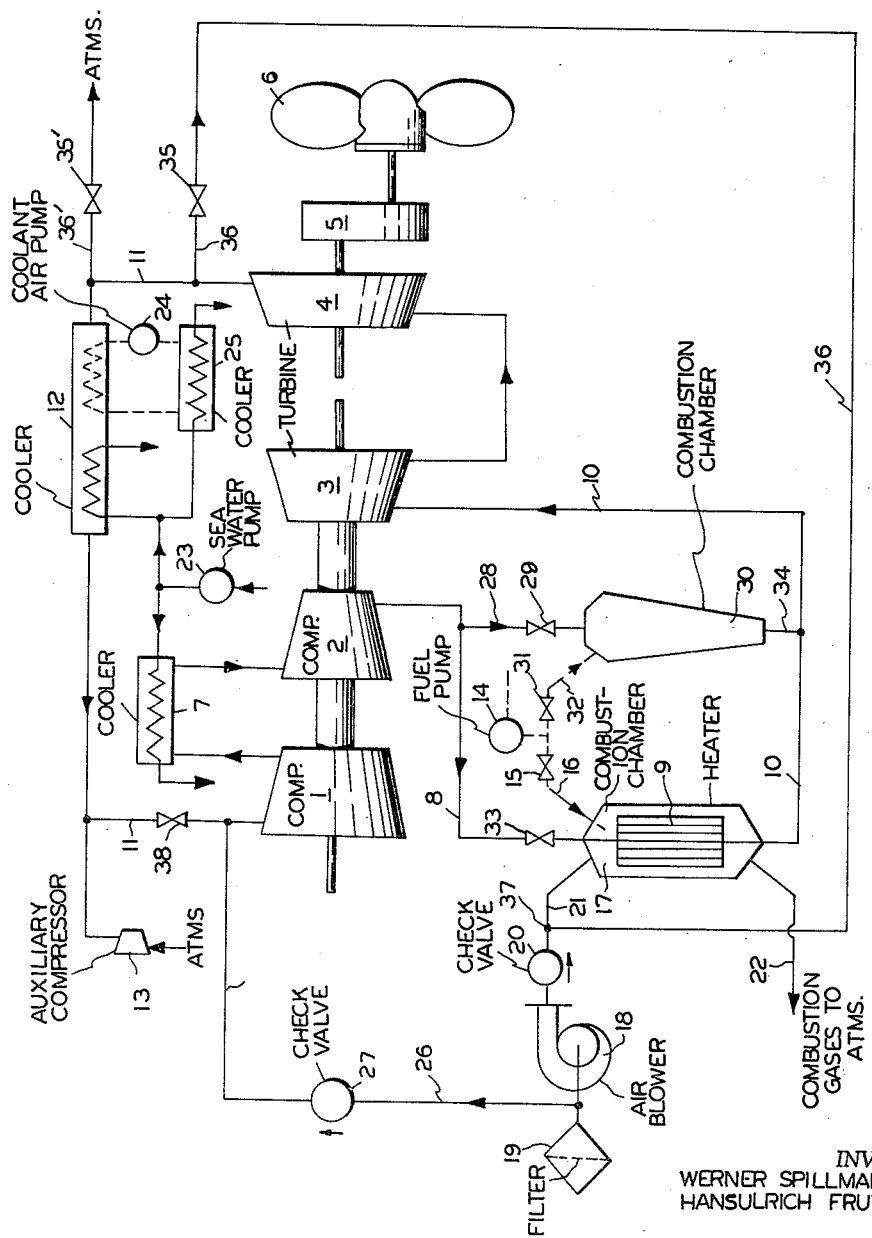

United States Patent Office 3,163,004
Patented Dec. 29, 1964

3,163,004
DUAL-CIRCUIT THERMAL POWER PLANT
Werner Spillmann, Kilchberg, and Hansulrich Frutschi, Zurich, Switzerland, assignors to Escher Wyss Aktiengesellschaft, Zurich, Switzerland, a corporation of Switzerland
Filed Nov. 18, 1963, Ser. No. 324,314
Claims priority, application Switzerland, Dec. 6, 1962, 14,321/62
6 Claims. (Cl. 60—39.75)

This invention relates to a thermal power plant, in which a gaseous working medium, preferably air, in the upper output range flows in a closed circuit under excess pressure relative to the atmosphere, the working medium being compressed in at least one compressor from a pressure above atmospheric to a higher pressure, is thereupon heated in a heater with supply of heat from the exterior through heat-exchanging walls, and is expanded in at least one turbine to the suction pressure of the compressor, while doing work.

Such thermal power plants operating with a closed circuit under excess pressure have the advantage that the machines and apparatus occupy a comparatively small space, because due to the high working medium density, only comparatively small flow cross sections are required to attain a predetermined throughput weight of working medium. Such a plant is therefore found to be favourable for use in a ship. If, in addition, the highest outputs are required in only a small portion of the operating period, it may be found advantageous, in the interests of space-saving, to reduce still further the flow cross sections in the apparatus, in which case, however, increased pressure loss and loss of efficiency must be accepted. This design, however, has the disadvantage that in the case of the lower outputs required during the greater part of the operating period, during which the pressure level in the circuit is reduced, the efficiency will not be better but will rather fall further somewhat. If, for example, for a ship in the greater part of the operating period only about half the maximum ship's speed is required, the output of the plant is only about ⅛ of the maximum output, the low-pressure part of the circuit coming within the region of atmospheric pressure.

It is now the aim of the invention to obtain an improvement in efficiency in the low output range. In a thermal power plant of the kind hereinbefore described this object is achieved according to the invention by the fact that piping and change-over shut-off members are provided, whereby in a lower output range air as working medium is drawn from the atmosphere by the compressor, the compressed air being led to a combustion chamber instead of to the heater, in which combustion chamber it is used for the combustion of fuel, and finally the resulting combustion gases are passed through the turbine and thereupon are allowed to escape into the atmosphere.

The step enables the plant to be operated in the low output range as an open gas-turbine plant. This eliminates the loss in pressure of the working air in the tubes of the heater, which is designed to small dimensions for spacesaving reasons. In addition, in heating the working air, it is not necessary to take into consideration the tempertaure permissible for the heater tubes, but the working air can be heated to the extent permitted by the turbine blading. Both the reduction in pressure losses and the increase in the working air temperature operate towards improving the efficiency of the plant.

Figure 2:
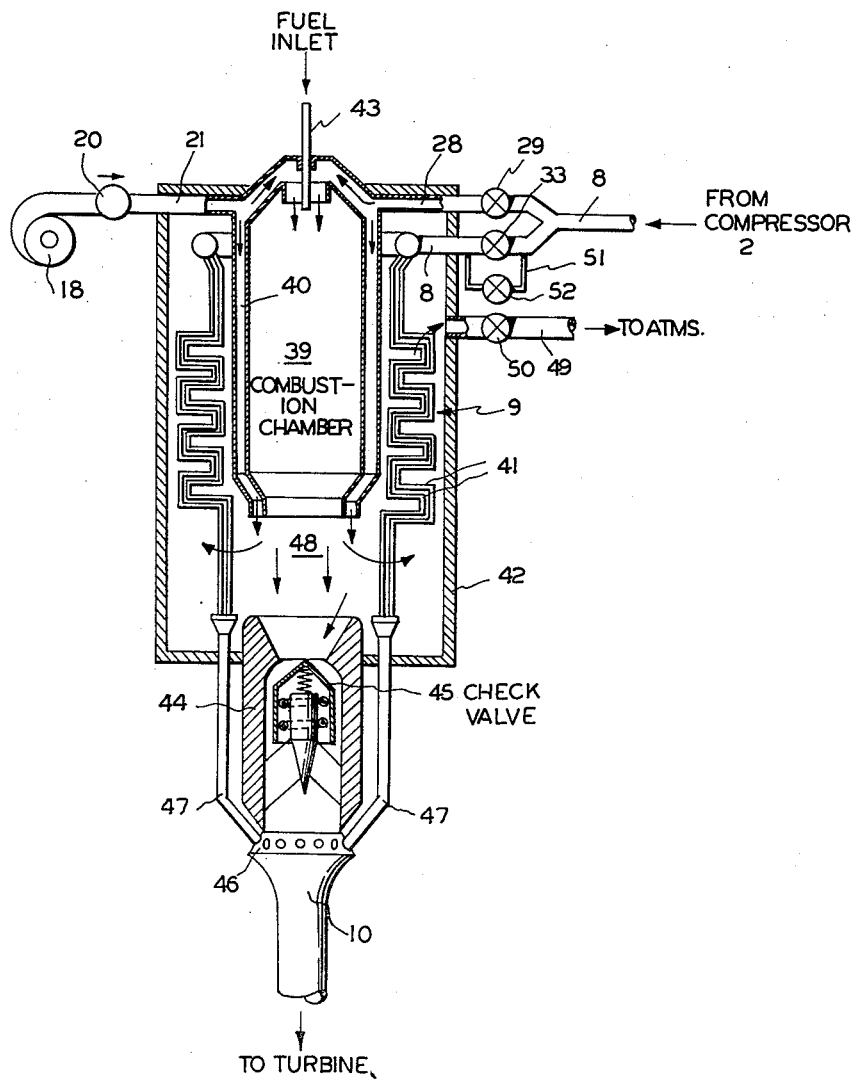

In the accompanying drawings, FIG. 1 represents in simplified form a constructional example of the subject of the invention. FIG. 2 furthermore shows a special embodiment of the combustion chamber with heater, which can be used for both modes of operating the plant.

According to FIG. 1, the plant has a compressor comprising two parts 1 and 2, through which the working medium flows in succession, and a turbine comprising two parts 3 and 4, through which the working medium flows in succession. The compressor parts 1 and 2 are driven by the turbine part 3, while the turbine part 4 drives a ship's propeller 6 through gearing 5.

The working medium delivered by the compressor part 1 first flows through an intermediate cooler 7, is compressed further in the compressor part 2 and, in the upper output range of the plant, passes through a pipe 8 into a heater 9 and thence through a pipe 10 successively through the turbine parts 3 and 4, where it is expanded, while doing work, almost to the suction pressure of the compressor part 1. A pipe 11 with cooler 12 returns the working medium to the suction side of the compressor part 1, thus closing the circuit. An auxiliary compressor 13 is in communication with the atmosphere on the suction side and serves for supercharging the circuit to a pressure above atmospheric.

The working air is heated in the heater 9 through heat-exchange walls with heat supply from the exterior. The heat required for this purpose is given off by combustion gases produced by the combustion of fuel which is pumped by a pump 14 and is introduced through a pipe 16, provided with a valve 15, into a combustion chamber 17 preceding the heater 9. The necessary combustion air is drawn from the atmosphere by a blower 18 through a filter 19, and is supplied to the combustion chamber 17 through a pipe 21 provided with non-return valve 20. After passing over the heat-exchange walls of the heater 9, the combustion gases pass through a flue 22 into the atmosphere.

Sea water supplied by a pump 23 is used for cooling the working medium in the coolers 7 and 12. On that side of the cooler 12 on which the hot working medium coming from the turbine part 4 enters, fresh air is provided as coolant, which is circulated by a pump 24 and is re-cooled in a cooler 25.

To enable the plant to be operated as an open gas-turbine plant in a lower output range, a pipe 26 with built-in non-return valve 27, connected between filter 19 and blower 18, is provided, this pipe opening in front of the compressor part 1 into the pipe 11 and allowing air as working medium to be drawn from the atmosphere by the compressor 1, 2. There is furthermore provided a pipe 28, with built-in valve 29, branching off the pipe 8, by means of which pipe 28 the compressed air can be led into a combustion chamber 30 instead of into the heater 9. In this combustion chamber 30, the air is used for the combustion of fuel, which is introduced into the combustion chamber 30 by the pump 14 through a pipe 32 provided with a valve 31. In this mode of operation, the valve 15 is shut. A valve 33, incorporated in the pipe 8, furthermore prevents compressed air from entering the heater 9. The combustion gases produced in the combustion chamber 30 are led from the latter through a pipe 34 into the pipe 10, through which they pass to the turbine 3, 4.

The flow connection between outlet of compressor part 2 and inlet of turbine part 3 thus comprises two branches namely the branch 8–10 leading the compressed working medium through the heater 9 and the branch 28–34 leading the compressed working medium through the combustion chamber 30.

Finally, after the outlet from the turbine 4, a pipe 36 provided with a valve 35 branches off the pipe 11 and opens at a point 37 into the pipe 21, so that the combustion gases pass through the combustion chamber 17, now not fed with fuel, to the heater 9 and thence escape into the atmosphere through the flue 22. A valve 38 incorporated in the pipe 11 of the working circuit serves to prevent the combustion gases, which are to be led away through the pipe 35, from having access to the suction side of the compressor part 1 when the plant is operated as an open gas turbine plant. A pipe 36' provided with a valve 35' allows the exhaust gas of the turbine 3, 4 to escape directly into the atmosphere.

In the upper output range, the valves 15, 33 and 38 are open, while on the contrary, the valves 29, 31 and 35 are shut. The circuit is charged with working air to the extent that the pressure above atmospheric prevails on the suction side of the compressor part 1. In the lower output range, on the contrary, the valves 15, 33 and 38 are shut and the valves 29, 31 and 35 are open. The compressor 1, 2 draws air from the atmosphere through the pipe 26, and the combustion gases produced in the combustion chamber 30 serve as working medium for the turbine 3, 4. The valves 33, 38 and 29, 35 thus constitute change-over shut-off members whereby, in the lower output range, air as working medium can be drawn by the compressor 1, 2 through the pipe 26 from the atmosphere, and the compressed air can be led to the combustion chamber 30 instead of to the heater 9, in which combustion chamber 30 the air is used for the combustion of fuel, the combustion gases thus formed being finally passed through the turbine 3, 4 and then allowed to escape into the atmosphere through the pipe 36.

When starting up, the plant will preferably first be operated as an open gas turbine plant. Due to the fact that the exhaust gas from the turbine 3, 4 is not released directly into the atmosphere, but is first at least partly supplied through the pipe 36 to the heater 9, the latter is preheated by the exhaust gas. It is thereupon possible to change over to closed-circuit operation.

According to FIG. 2, a cylindrical combustion chamber 39 is provided for both modes of operation. The combustion chamber 39 is surrounded by a cooling jacket 40. The heater 9 consists of a large number of tube coils 41 and is arranged co-axially round the combustion chamber 39. The whole is enclosed by a casing 42. A pipe 43 serves for the supply of fuel to the combustion chamber 39.

The pipe 8 coming from the pressure side of the compressor part 2 and provided with the valve 33 leads into the heater 9. Both the pipe 21 from the blower 18 and provided with the non-return valve 20 and the pipe 28, branching off the pipe 8 and provided with the valve 29, lead into the combustion chamber 39. The connecting pipe 10 leading to the turbine 3, 4 has a part 44, built on to the heater casing 42, which part is arranged co-axially with and in axial extension of the combustion chamber 39 and is provided with a cooled non-return valve 45, which allows working medium to flow only from the combustion chamber 39 into the pipe 10, but not in the opposite direction. The pipe 10 also has an annular header 46, which is connected after the valve 45 in the flow direction and opening into it are manifold pipes 47 for the heated working air issuing from the tube coils 41 of the heater 9. These manifold pipes 47 are arranged annularly around the part 44 of the pipe 10.

When the plant is operated with closed circuit of the working medium, the valve 29 is shut. The combustion air is supplied from the atmosphere by the blower 18 through the pipe 21. The working medium, at a higher pressure relative to the combustion chamber, passes through the pipe 8 by way of the now open valve 33 into the tube coils 41 of the heater 9 and thence by way of the manifold pipes 47 and the header 46 to the pipe 10 leading to the turbine. The non-return valve 45 is in this case closed.

Between the end of the combustion chamber 39, remote from the combustion air inlet, and the part 44 of the pipe 10 a space 48 is left free, through which the combustion gases now pass into the annular space between the combustion chamber 39 and the casing 42, so that they serve as heating gases for the heater 9. Thereupon they flow away through a pipe 49, in which is incorporated a valve 50, open in this mode of operation.

If the plant is to be operated as an open gas-turbine plant, the valve 33 is closed, while the valve 29 is opened. The compressed working air coming from the compressor part 2 in this case passes to the combustion chamber 39, instead of to the heating coils 41 of the heater 9. The valve 50 is shut, so that the combustion gases formed are obliged to pass into the pipe 10, while lifting the valve 45, and are thereupon used as working gases in the turbine before they are released into the atmosphere.

To counter the danger of overheating the now not used tube coils 41 of the heater 9, the supply pipe 8, leading to the heater for the air compressed by the compressor of the circuit, is provided with a pipe 51 by-passing the valve 33 and having its own valve 52, whereby a partial quantity of compressed air can be passed through the heater 9 even when the valve 33 is shut.

What is claimed is:

1. A thermal power plant operating with a gaseous working medium comprising compressing means in which said working medium is compressed from an initial pressure to a higher pressure; heating means in which the so-compressed working medium is brought to a higher temperature; and turbine means in which the so-heated compressed working medium is allowed to expand while doing work; said heating means comprising a heater having heat exchange walls through which the working medium may receive heat from the exterior and a combustion chamber in which fuel may be burnt in the working medium; a flow connection between the outlet of said compressing means and the inlet of the turbine means; said flow connection having two branches, one for leading the compressed working medium through said heater and the other for leading the compressed working medium through said combustion chamber; a flow connection including a cooler leading from the outlet of the turbine means to the inlet of the compressing means; a flow connection between the outlet of the turbine means and the atmosphere; a flow connection between the inlet of the compressing means and the atmosphere; and valve means in said flow connections allowing selectively to operate the plant with one of the following circuits:
    (a) an open circuit in which the inlet of the compressing means and the outlet of the turbine means are connected to the atmosphere and the compressed working medium flows through the combustion chamber, and
    (b) a closed circuit in which the expanded working medium flows from the outlet of the turbine means through said cooler to the inlet of the compressing means and the compressed working medium flows through said heater; and means for raising the inlet pressure of the compressing means above atmospheric pressure when the plant is operated with the closed circuit.

2. The combination defined in claim 1 in which said one branch for leading the compressed working medium to the heater is provided with a shut-off valve and a pipe by-passing said shut-off valve so as to permit a partial quantity of the compressed working medium to pass through the heater even when the shut-off valve is closed.

3. The combination defined in claim 1 in which the combustion chamber is provided with flow connections including valve means which permit the supply of atmospheric air to the combustion chamber and direct the combustion gases issuing from the combustion chamber to the air heater so as to supply heat to the working medium when the plant is operated with the closed circuit.

4. The combination defined in claim 3 in which the branch for leading the working medium from the combustion chamber to the turbine means has a part adjoining the combustion chamber and having a built-in valve, and in which the heater is provided with outlet manifold pipes for the heated working medium which open into said branch after said built-in valve in the flow direction.

5. The combination defined in claim 4 in which said built-in valve is in the form of a non-return valve.

6. The combination defined in claim 5 in which the heater is arranged co-axially around the combustion chamber and the part having the built-in valve of said branch leading to the turbine means is arranged co-axially with and in axial extension of the combustion chamber, and in which said manifold pipes for the heated working medium are arranged around said part and said branch in the region adjoining said part is formed as an annular header for the reception of the manifold pipes.

References Cited by the Examiner
UNITED STATES PATENTS 2,392,623  1/46  Traupel _____ 60—59
2,645,083  7/53  Brunner _____ 60—59 X JULIUS E. WEST, Primary Examiner.